United States Patent [19]
Freimark et al.

[11] Patent Number: 5,996,284
[45] Date of Patent: *Dec. 7, 1999

[54] SLIDING VEHICLE WINDOW

[75] Inventors: Corey A. Freimark, Grandville; Daniel J. Fisher, Holland, both of Mich.

[73] Assignee: Donnelly Corporation, Holland, Mich.

[*] Notice: This patent is subject to a terminal disclaimer.

[21] Appl. No.: 09/099,567

[22] Filed: Jun. 18, 1998

Related U.S. Application Data

[63] Continuation of application No. 08/806,648, Feb. 26, 1997, Pat. No. 5,799,444, which is a continuation of application No. 08/498,587, Jul. 6, 1995, abandoned.

[51] Int. Cl.⁶ .................................................. E06B 1/00
[52] U.S. Cl. ................................. 49/209; 49/380; 49/413
[58] Field of Search .............................. 49/380, 209, 212, 49/213, 214, 449, 130, 276, 277, 278, 413; 292/300

[56] References Cited

U.S. PATENT DOCUMENTS

| | | | |
|---|---|---|---|
| 679,633 | 7/1901 | Mendenhall | 49/213 |
| 1,891,478 | 12/1932 | Meatheringham | 49/48 |
| 2,483,061 | 9/1949 | Omans | 49/450 |
| 2,658,791 | 11/1953 | Anderson | 296/44 |
| 3,538,642 | 11/1970 | Fredricksen | 49/213 |
| 3,841,516 | 10/1974 | Marz | 49/394 |
| 4,124,054 | 11/1978 | Spretnjak | 49/413 |
| 4,317,312 | 3/1982 | Heideman | 49/220 |
| 4,489,965 | 12/1984 | Taylor | 292/34 |
| 4,561,224 | 12/1985 | Jelens | 52/207 |
| 4,570,381 | 2/1986 | Sterner, Jr. | 49/129 |
| 4,573,286 | 3/1986 | Favrel et al. | 49/214 |
| 4,575,966 | 3/1986 | Gerritsen | 49/209 |

(List continued on next page.)

FOREIGN PATENT DOCUMENTS

| | | |
|---|---|---|
| 470714 | 9/1927 | Germany . |
| 63-71415A | 3/1988 | Japan . |
| 63-71416A | 3/1988 | Japan . |
| 2-53630 | 2/1990 | Japan . |
| 550654 | 1/1943 | United Kingdom . |
| 445685A1 | 9/1991 | WIPO . |

*Primary Examiner*—Daniel P. Stodola
*Assistant Examiner*—Curtis A Cohen
*Attorney, Agent, or Firm*—Price, Heneveld, Cooper, DeWitt and Litton

[57] ABSTRACT

A sliding vehicle window assembly which includes at least one, and preferably a pair, of window panels spaced from each other to define a window opening and interconnected by upper and lower frame members or tracks, bonded to the interior surface of the pair of window panels. The upper and lower frame members are also spaced vertically apart from each other. At least one, and preferably two, arcuate channels are defined in each of the inwardly facing walls of the two frame members—the two channels arranged generally in tandem or end-to-end alignment. The pair of channels in each frame member are configured to receive a window panel, opposite ends of which retain cam or channel followers received by the channels. A latch handle interconnects one end of each cam follower and includes a cam projection also received in the channel and when rotated in one end of the channels, moves the sliding window generally perpendicularly with respect to the window opening when the window is located over the window opening. The sliding window is sealed against the window opening by a seal fixed to the interior surface of the fixed window panels carried in a seal carrier which spans the upper and lower portions of the window opening. The advantages include a sliding vehicle window assembly which is substantially flush with the exterior of the vehicle. There are no components which extend beyond the exterior surface of the fixed panels. Additionally, all of the components may be injection molded from lightweight, rigid materials, resulting in less expense. Moreover, the window assembly design is easy to assemble resulting in less man hours per unit and, as a result, less cost. The window assembly is easily adapted to any one of a number of different gasketing techniques used to retain the vehicle window assembly in the vehicle window opening.

10 Claims, 9 Drawing Sheets

U.S. PATENT DOCUMENTS

| | | | |
|---|---|---|---|
| 4,635,398 | 1/1987 | Nakamura | 49/413 |
| 4,662,108 | 5/1987 | Duran Romero et al. | 49/130 |
| 4,666,206 | 5/1987 | Hough | 49/493.1 |
| 4,785,583 | 11/1988 | Kawagoe et al. | 49/413 |
| 4,850,139 | 7/1989 | Tiesler | 49/130 |
| 4,920,698 | 5/1990 | Friese et al. | 49/380 |
| 4,934,098 | 6/1990 | Prouteau et al. | 49/214 |
| 5,052,743 | 10/1991 | Inada et al. | 49/493.1 |
| 5,069,497 | 12/1991 | Clelland | 296/155 |
| 5,072,952 | 12/1991 | Irrgeher et al. | 277/229 |
| 5,228,740 | 7/1993 | Saltzman | 296/146 |
| 5,261,189 | 11/1993 | Chu | 49/404 |
| 5,261,721 | 11/1993 | Conger et al. | 49/475.1 |
| 5,294,168 | 3/1994 | Kronbetter | 296/146.16 |
| 5,442,880 | 8/1995 | Gipson | 49/413 |
| 5,505,023 | 4/1996 | Gillen et al. | 49/413 |
| 5,799,444 | 9/1998 | Freimark et al. | 49/413 |

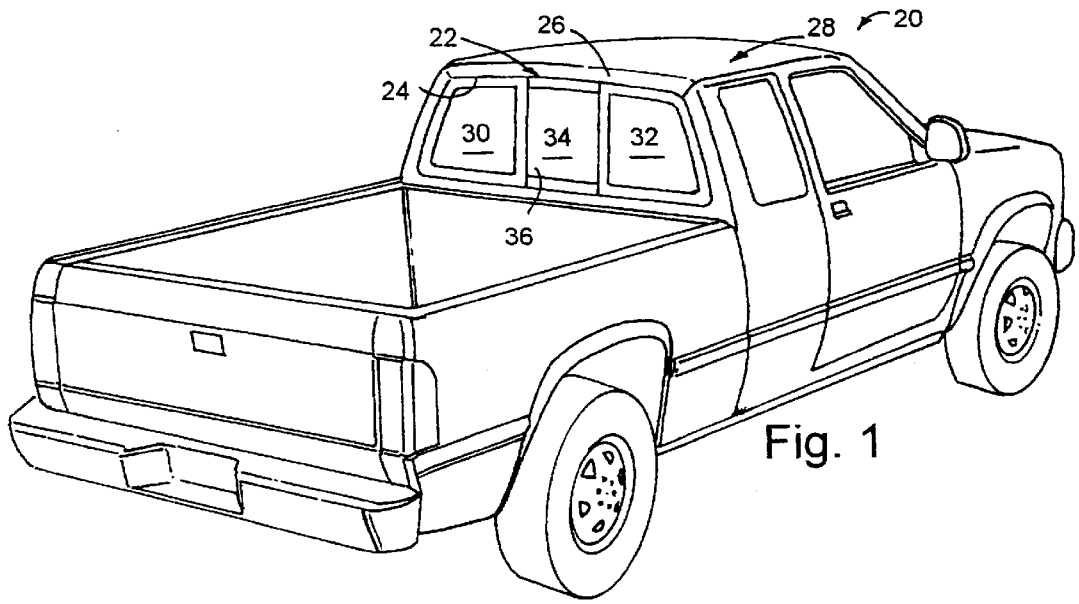
Fig. 1
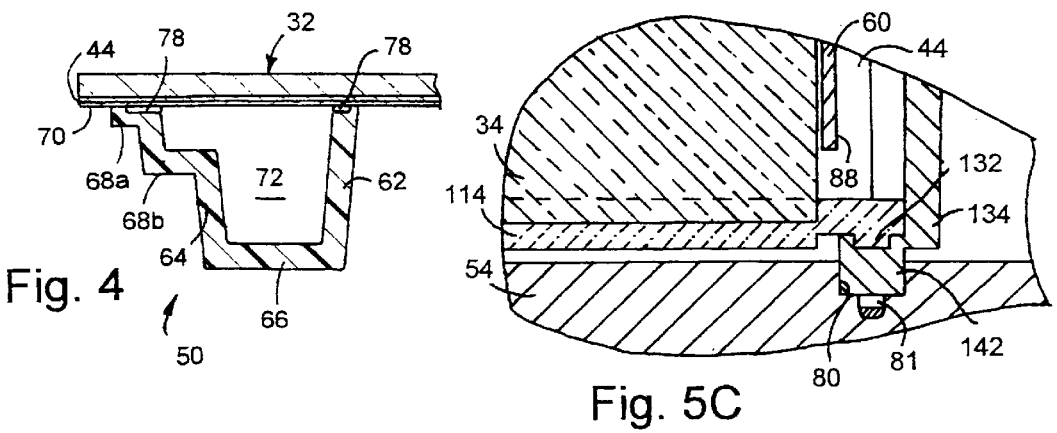
Fig. 4
Fig. 5C
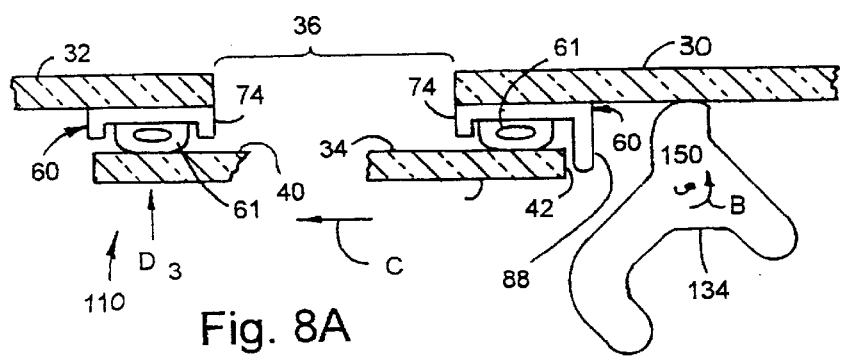
Fig. 8A

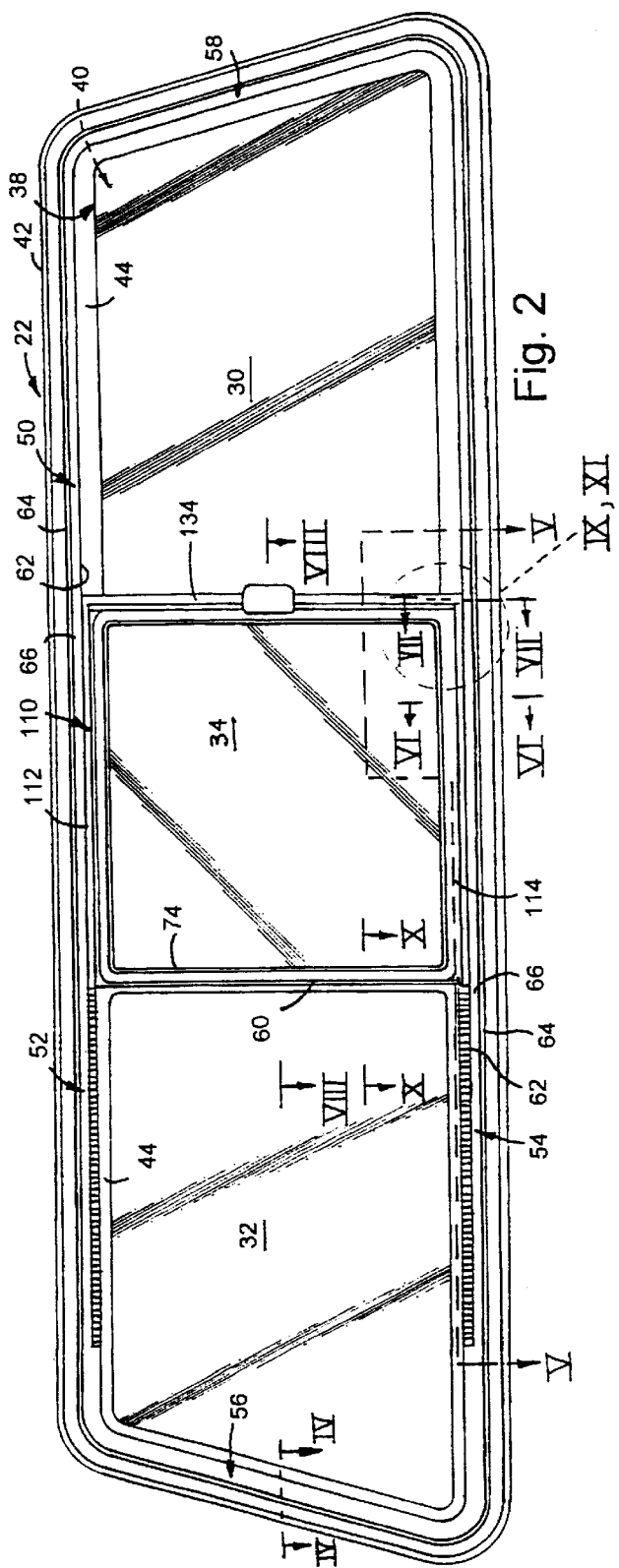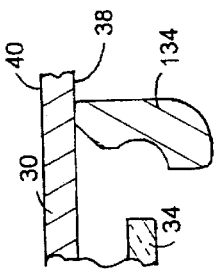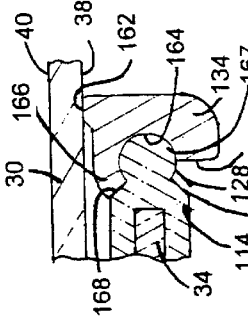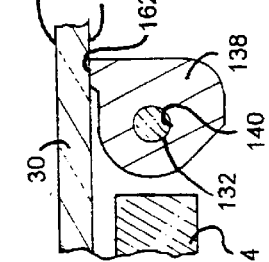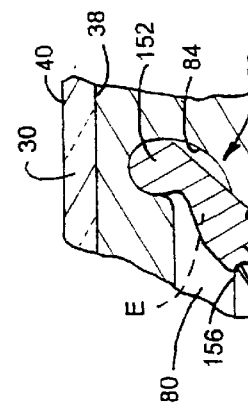

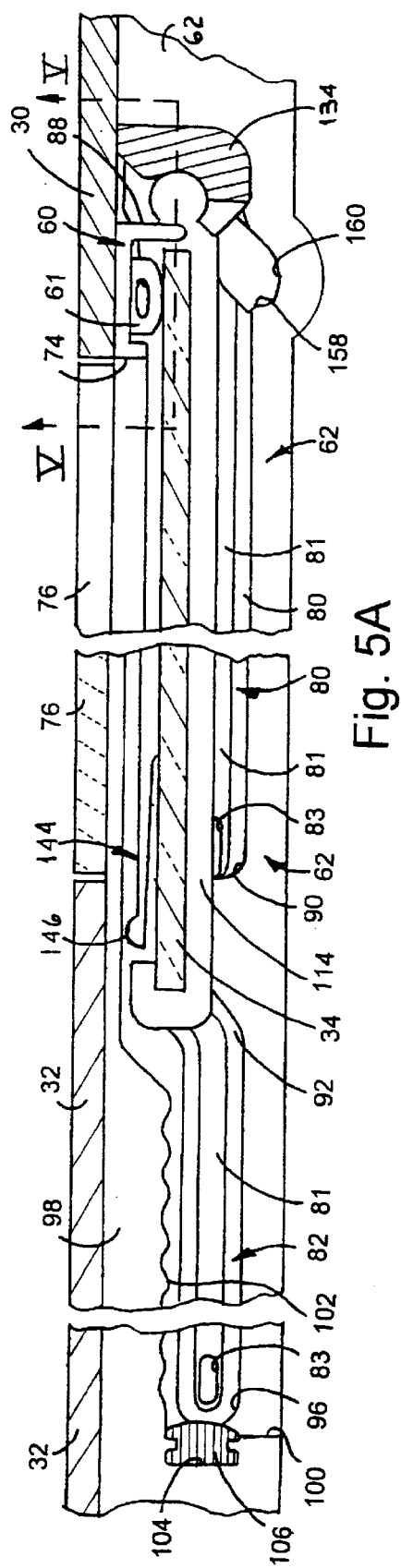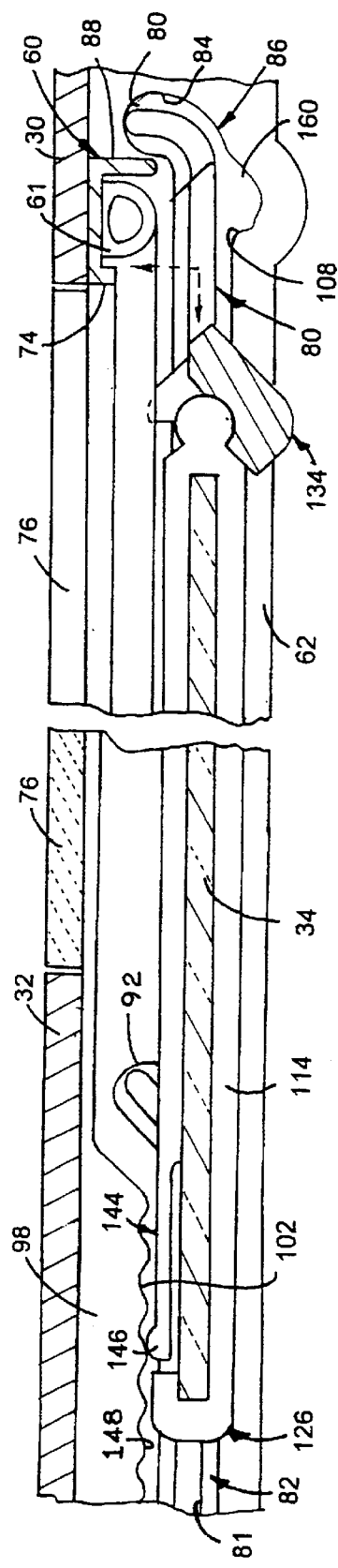
Fig. 5A
Fig. 5B

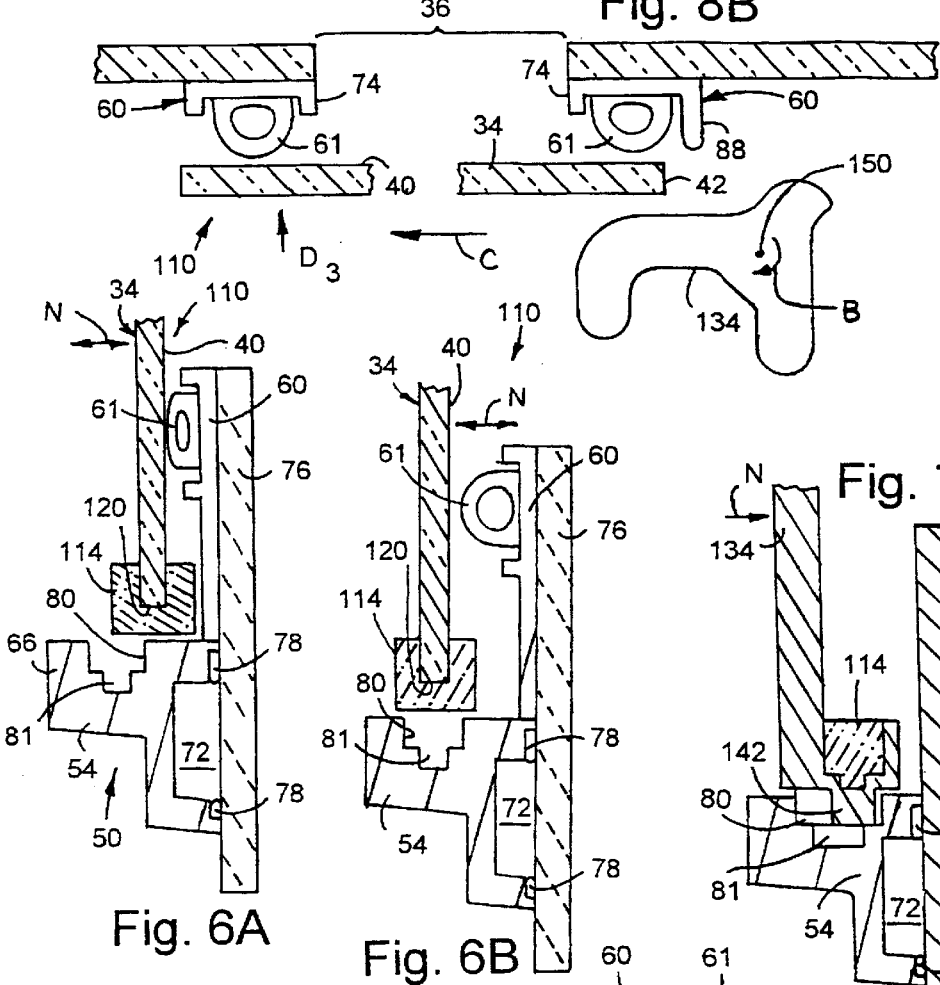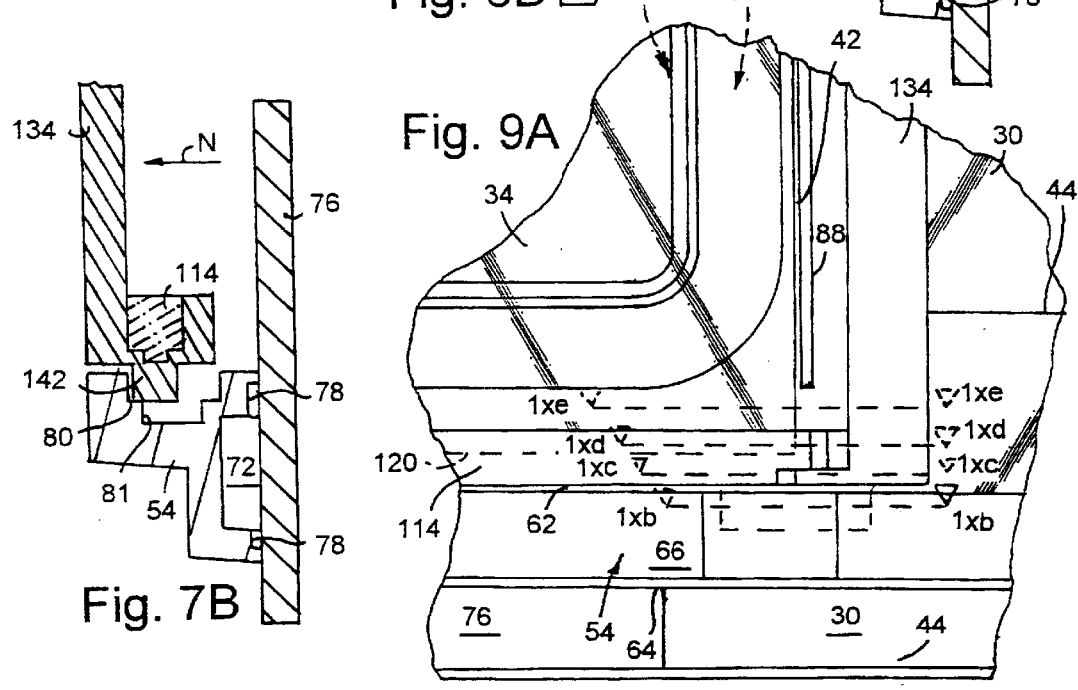

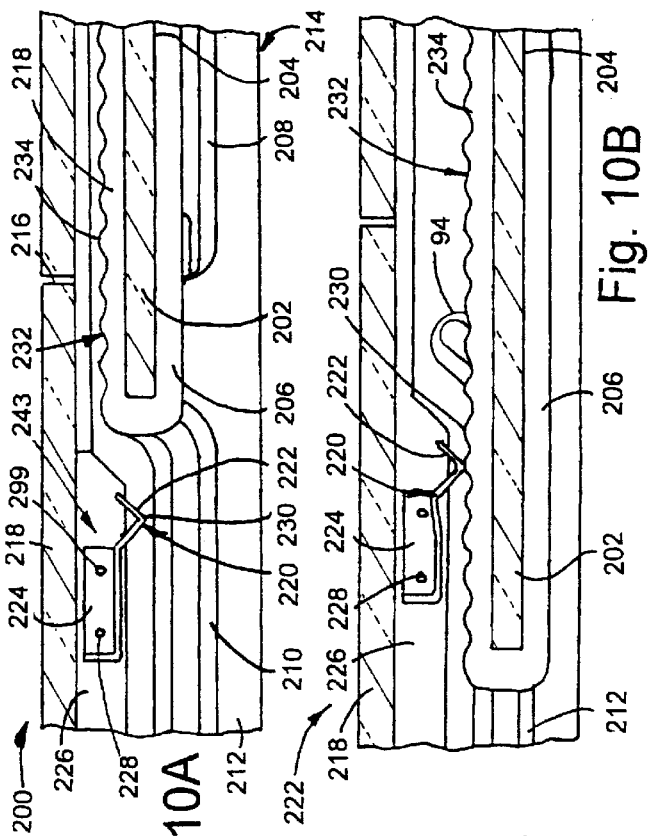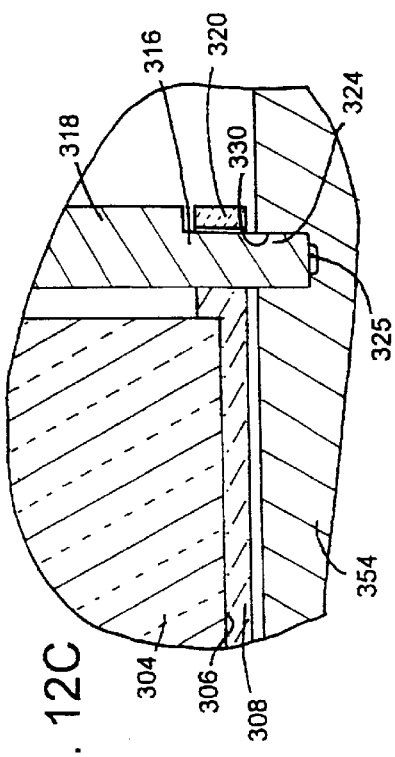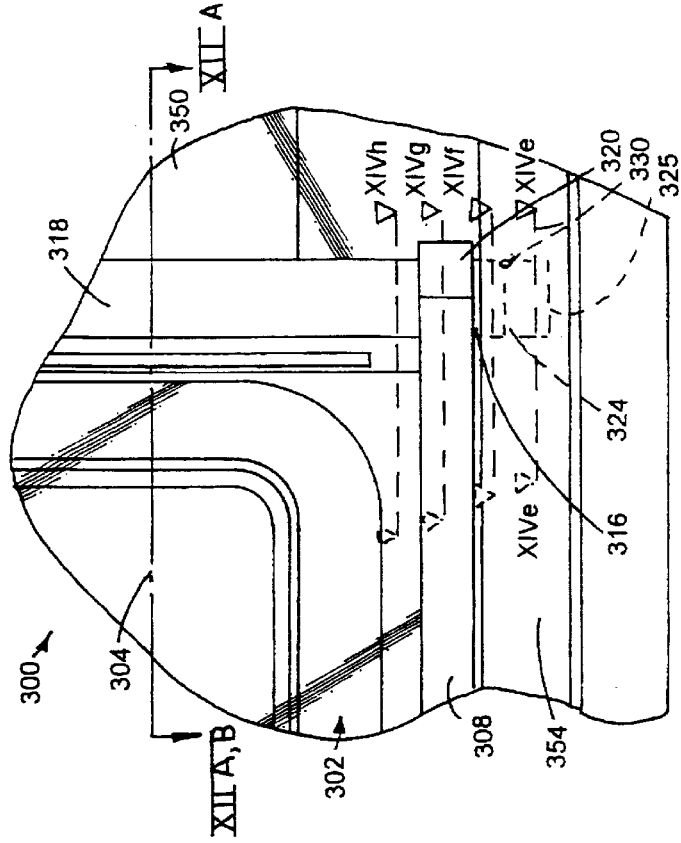

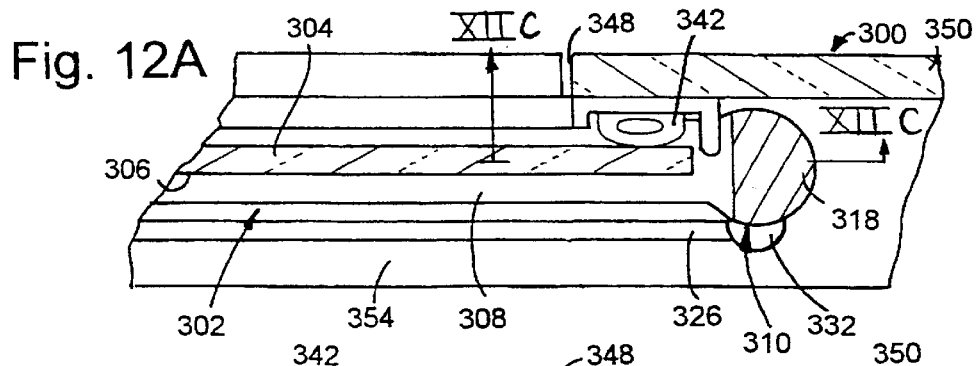
Fig. 12A
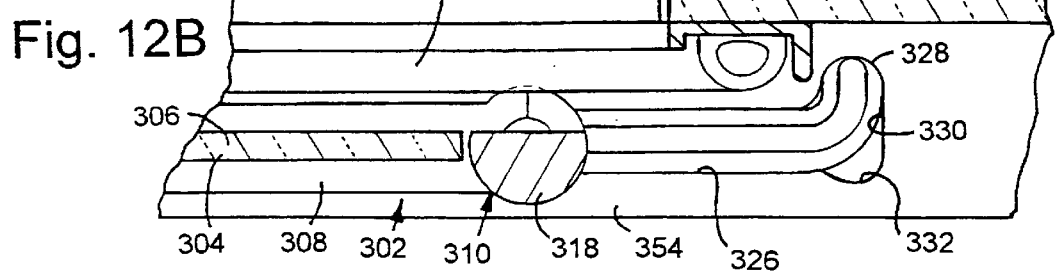
Fig. 12B
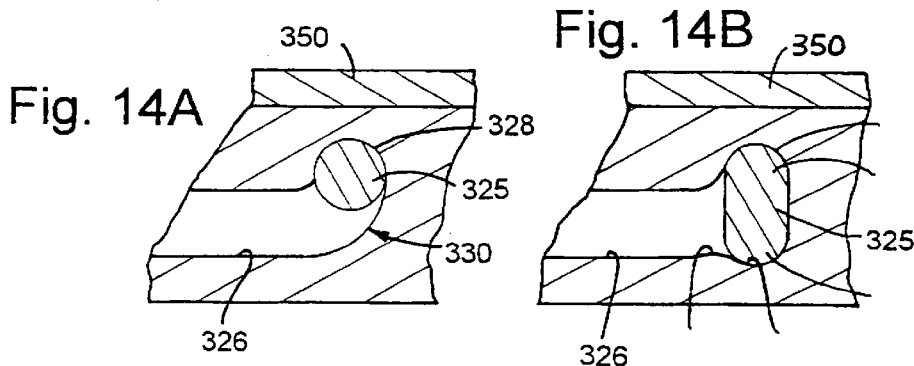
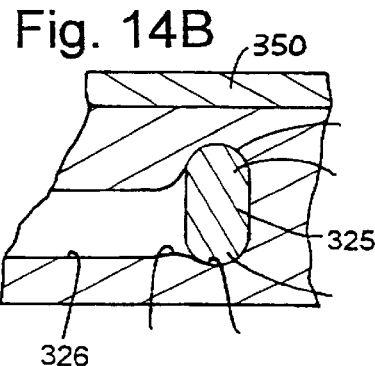
Fig. 14A  Fig. 14B
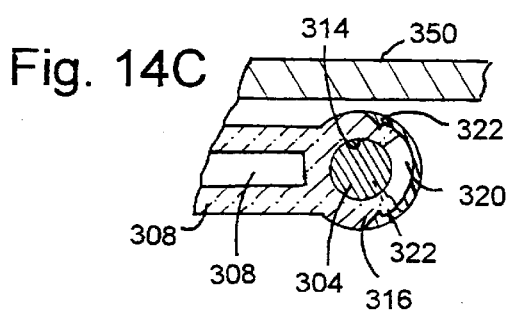
Fig. 14C
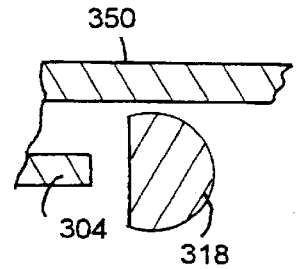
Fig. 14D

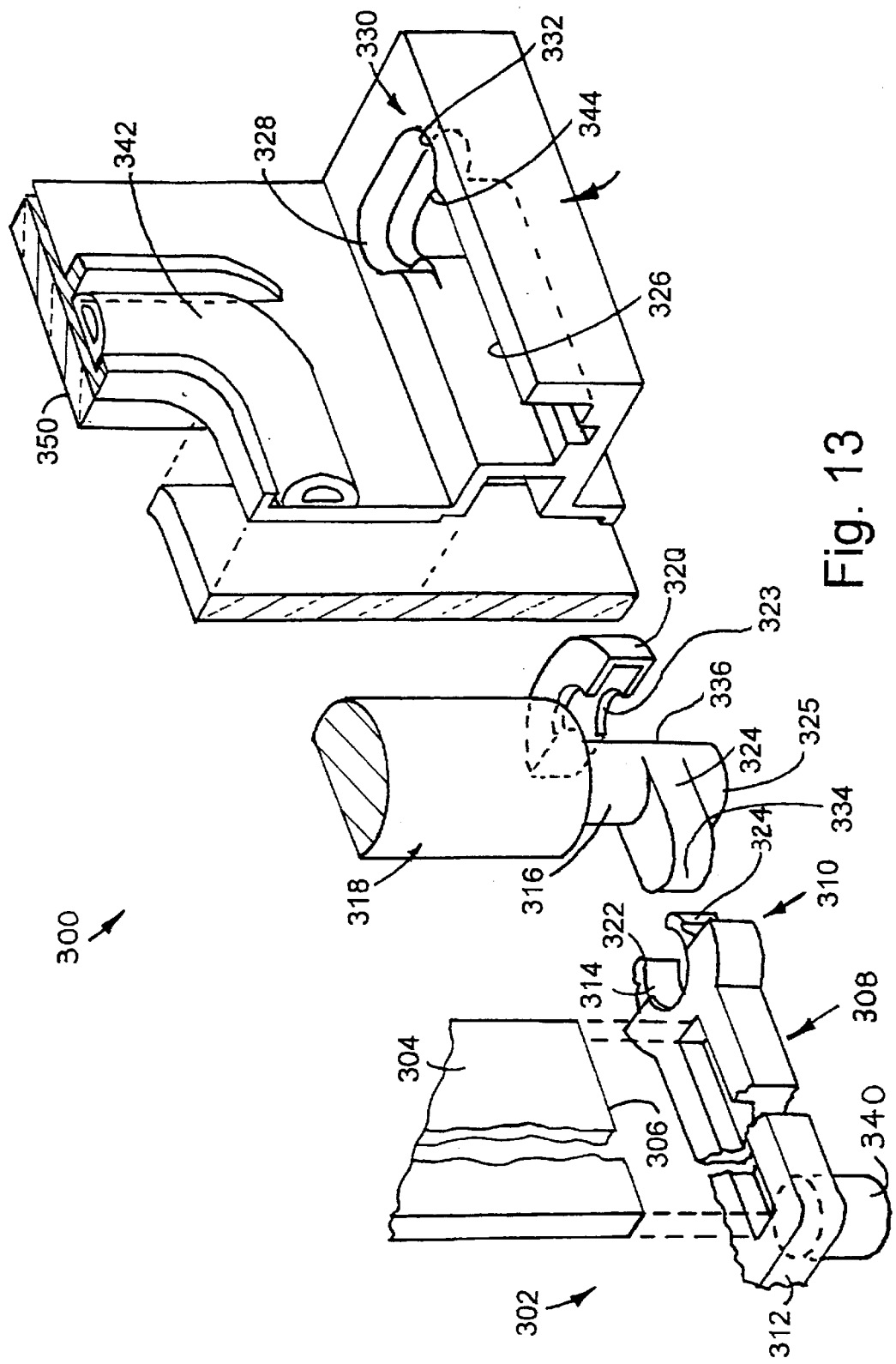

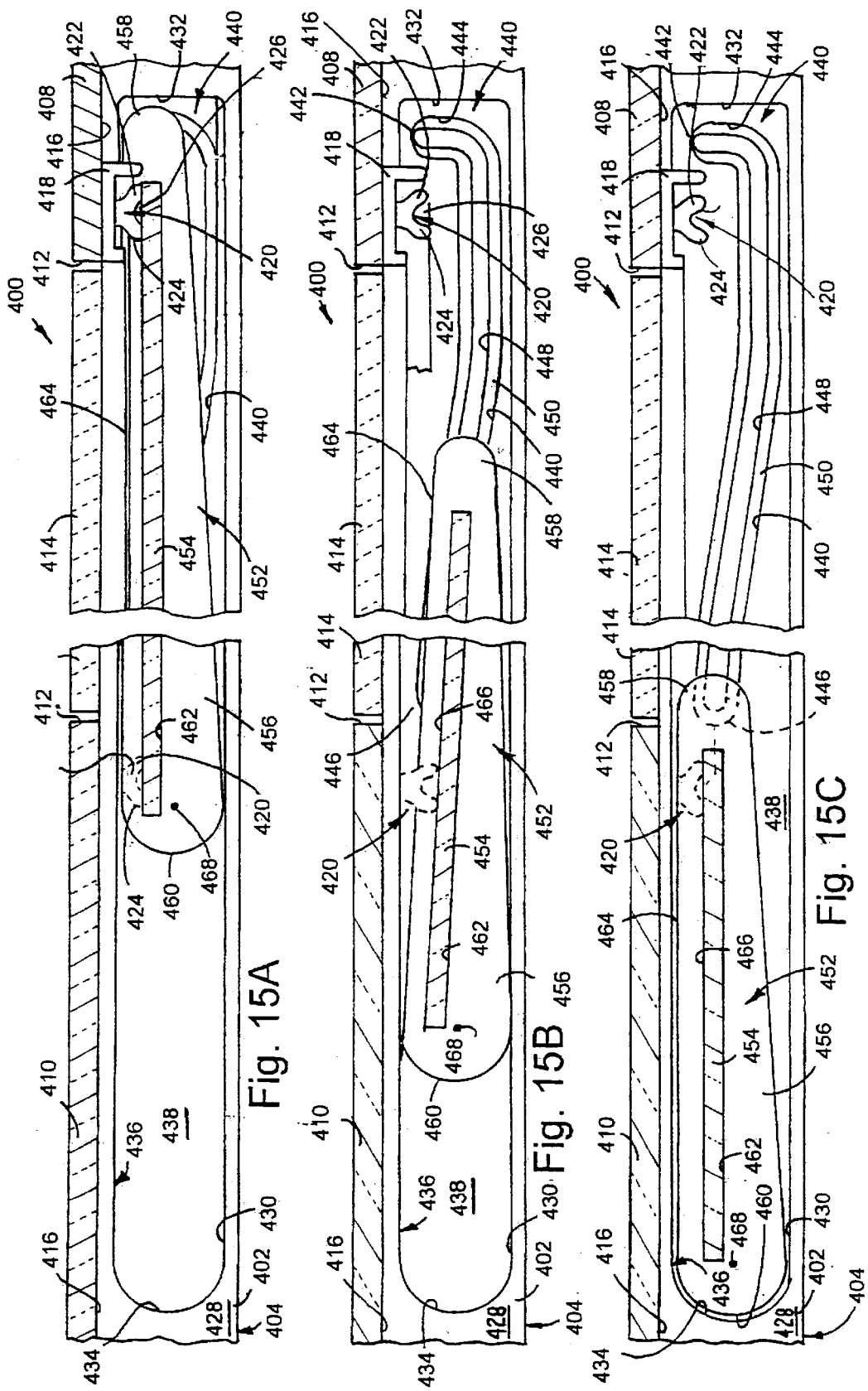

SLIDING VEHICLE WINDOW

RELATED APPLICATIONS

This application is a continuation of U.S. patent application Ser. No. 08/806,648, filed Feb. 26, 1997, entitled SLIDING VEHICLE WINDOW, now U.S. Pat. No. 5,799,444, which is a continuation of U.S. patent application Ser. No. 08/498,587, filed Jul. 6, 1995, entitled SLIDING VEHICLE WINDOW, now abandoned.

BACKGROUND OF THE INVENTION

This invention relates generally to sliding window assemblies for use in vehicles and, more particularly, to a window assembly having an improved mechanism for moving a window panel into a closed, sealed position over a window opening and a method for manufacturing a sliding window assembly.

Many utility vehicles, including vans and pickup trucks, have large fixed panels of glass. To improve circulation, the fixed window panels may contain sliding panels adapted to move and provide a window opening. One example of such a panel assembly appears with increasing frequency as the horizontally movable rear window of pickup trucks. Such sliding rear windows or backlights are often provided to the truck manufacturer, or in the after-market, as window frame assemblies. Current commercially available sliding window assemblies are mechanically complex having large numbers of components (30 to 40), resulting in increased cost. Moreover, despite the relative complexity, many commercially available sliding window assemblies do not seal well resulting in air and water leaking past the seals. For example, a typical commercially available sliding window panel assembly generally includes a welded aluminum frame which is sized to fit in the body panel opening. The inner face of the frame provides a continuous channel which supports the upper and lower edges of the sliding window pane. A pair of fixed window panes are supported in a second, inwardly opening channel adjacent the first. The edges of the fixed window panels are often supported by vertical struts which are secured between the upper and lower portions of the frame. The remaining sides of the fixed window panes are then secured or sealed in the frame. Often, a lip is provided on the struts or frame which is configured to engage the sliding window panels to prevent leakage of moisture when the windows are in the closed position. For example, see U.S. Pat. No. 4,124,054 to Spretnjak.

U.S. Pat. No. 4,561,224 to Jelens discloses a sliding window assembly having a continuous frame constructed of a thermoplastic material. When assembled, the sliding window assembly provides a unit frame configured to receive one or more fixed window panels and a sliding window. The peripheral edge of the stationary window panels receive a channel molding which, in turn, is positioned within and sealed within channels formed within the frame assembly. This particular construction retains the fixed window panel assemblies in a "three-sided" encapsulation. The frame assembly also includes an outwardly extending seal which is mounted along and around the perimeter of the window frame in an outwardly facing channel. The seal snugly fits within the body opening and is sealed and retained therein to seal the window assembly with the vehicle.

Other sliding window assemblies have been provided which utilize both metal and polymeric structures. One example of such a structure is shown in U.S. Pat. No. 5,228,740 to Saltzman. In general, the Saltzman window frame assembly uses a metallic frame having inwardly facing channels. An outwardly facing channel is also formed in the frame. One or more sliding window frames are disposed in the inwardly facing channels for movement between open and closed positions. Seals having opposed securing shoulders that cooperatively interact with a latch are provided to secure the seal in the second channel. A lip extending from the seal engages the sliding window frames. The fixed window panels are disposed in the second inwardly facing channel linearly adjacent the seal for closing a portion of the frame and overlapping the sliding window frames. A polymeric cover is secured with the front face of the frame and is secured within the outwardly facing channel of the frame. A lip portion extends outwardly from the cover to engage the body panel for centering the frame assembly relative to the opening in the body panel. The metallic frame and the elastomeric covering are adhered in the window opening by a bead of adhesive.

In U.S. Pat. No. 5,294,168 to Kronbetter, a variation of this structure is provided wherein the welded aluminum frame and elastomeric members are combined to provide a frame assembly adapted to fit within an opening of a body panel. The welded metal frame includes an outwardly facing channel formed in the outer periphery. The supporting member has a continuous lip portion which extends outwardly from the outwardly facing channel. The lip portion provides a protecting and centering function which acts circumjacent the outer periphery or perimeter of the metal frame. When the frame assembly is fitted into the opening of the body panel, the supporting lip prevents contact between the metal frame and the painted surface of the body panel.

U.S. Pat. No. 4,850,139 to Tiesler teaches a sliding window assembly for a vehicle which has a fixed window in a frame which is substantially flush with the frame at its exterior, and includes a sliding window movable between open and closed positions and releasable locks for locking the sliding window in its closed position. The sliding window, when moved to its open position, is parallel to and behind the fixed window. When moved forward to its closed position, the sliding window is automatically cammed and moved outwardly so as to lie in the same plane and flush with the fixed windows.

A further disadvantage associated with the prior sliding window assemblies is that few are capable of providing a true flush or single-sided window assembly. That is to say that the frame retaining the fixed and sliding window panels always has a portion which is exposed on the exterior side of the window panel. Currently available sliding window panel assemblies would not comport with the current trend for flush-mounted window panels. Moreover, many commercially available sliding window panel assemblies do not provide the desired sealing performance. Their relative mechanical complexity also makes them more expensive to produce.

SUMMARY OF THE INVENTION

The instant invention provides a number of advantages over prior sliding window panel assemblies including few parts which interact to provide superior sealing performance and reduced cost in both labor and materials. The invention also provides greater flexibility in that the same design may be used with three-sided gasket encapsulations as well as in flush panel applications. The sliding window panel is installed in such a manner such that it moves in two directions between an opened and closed position in one fluid motion with a detent to fix the position of the window at any one of a number of locations. A one-piece compression seal about the window opening provides an improved seal which may be attached or co-molded with the window panel frame. In combination with the above features, the sliding window can be easily removed for servicing.

In general, the invention includes a sliding window panel assembly having a polymeric frame fastened to one side of a pair of fixed window panels. The polymeric frame includes a pair of camming channels in the upper and lower portion of the frame to move a sliding window tightly against a seal. When opened, the camming channels move the sliding window generally perpendicularly away from the window opening, and then parallel to the window opening adjacent one of the fixed window panels.

According to one aspect of the invention, the sliding vehicle window assembly includes at least one, and preferably a pair, of window panels spaced from each other to define a window opening and interconnected by upper and lower frame members or tracks bonded to the inner surface of the window panels. The upper and lower frame members are also spaced vertically apart from each other. At least one, and preferably two, arcuate channels are defined in each of the inwardly facing walls of the two frame members—the two channels arranged generally in tandem or end-to-end. The channels in each frame member are configured to receive a window panel, opposite ends of which retain track or channel followers received by the channels. A latch handle extending between the upper and lower frame member and attached to the window panel, includes a pair of opposing cam projections. When the handle is rotated, the cam projections move the sliding window generally perpendicularly over the window opening and overlying the fixed window panels. The sliding window is sealed against the window opening by a seal disposed on a seal carrier located about the window opening.

In another form of the invention, a unitary frame assembly is bonded to the interior surfaces of the two window panels proximate the exterior perimeters of the window assembly. The frame assembly also includes an integral seal carrier which is bonded to the interior surface of the fixed window panels adjacent the window opening defined between the two window panels. The seal carrier contains a seal which substantially surrounds the window opening. Plastic appliques or glass strips may span the window opening and be coplanar with the fixed panels to conceal the upper and lower members of the frame assembly.

In yet another form of the invention, the sliding window panel has opposing end caps. One end of each end cap may have a cam follower extending therefrom to engage one of the channels formed on the upper or lower member. The opposite end of each end cap includes a generally C-shaped structure, configured to receive a portion of a shaft extending from opposite ends of a handle and interconnecting the opposing end caps. The handle is configured to be journaled in the ends of the end caps and is retained thereon by a cap received over the two tabs. The ends of the handle shaft define the second projection to be received in the channels for controlling the sliding movement of the window. Between the journal bearing of each end cap and the end of each shaft is a cam projection configured to slide in the channels when translating in a direction generally parallel to the fixed windows, and also to urge or force the sliding window panel in a direction generally normal to the fixed window panels when positioned over the window opening. Rotation of the handle causes the cam to move the window in and out of sealing engagement over the window opening.

According to another form of the invention, the sliding window panel is retained by a pair of opposing channels in a manner such that the window panel rotates between an open and closed position once slid into position rather than in a translation motion normal to the fixed window panels. In this embodiment, a simple construction is provided for the end caps, requiring only a single cam following pin at each end of the sliding window panel.

In all of the embodiments of the invention, the upper and lower frame members contain an arcuate channel configuration which cams the sliding window panel in a direction generally perpendicular to the fixed window panels when moving the sliding window in and out of sealing engagement with the window opening. Once open, the sliding window may be moved generally parallel to the fixed window panels to a fully open position. In the fully open position, the channels move the sliding window panel generally parallel and adjacent to one of the fixed window panels.

Each of the window panel assembly embodiments may be bonded in the vehicle window opening using conventional adhesives. The adhesive beads may be applied to the surface of the frame adjacent the window opening pinch weld flange, or they may be applied directly to the interior surface of the glass panels, but outboard the frame assembly. Alternatively, polymeric gaskets or sealing members may be bonded to the interior surface of the window panels. Studs and other mechanical fasteners may also be used.

Additional advantages resulting from the various forms of the invention include an assembly where substantially all of the components may be molded from lightweight, rigid material, resulting in less weight and expense. Moreover, the window panel assembly is easy to manufacture resulting in less man hours per unit and, as a result, less cost. The sliding window panel frame can be attached to the two fixed window panels, and the sliding panel can be inserted later. The applique or decorative glass strips may be bonded to the frame at any time. Yet another advantage provided by this invention is the versatility and compatibility to receive a wide range of molded or extruded gaskets or sealing members to accommodate a wide range of vehicle openings. One-, two-, and three-sided gasket encapsulations may be attached to the vehicle window assembly. This versatility also accommodates a number of adhesive applications to bond the window assembly in the vehicle opening.

BRIEF DESCRIPTION OF THE DRAWING FIGURES

A better understanding of the invention and the advantages provided thereby may be obtained by reference to the specification and the attached drawing figures, wherein:

FIG. 1 generally illustrates one embodiment of a backlight of the invention in a pickup truck;

FIG. 2 is an elevational view of one embodiment of a sliding backlight of this invention;

FIG. 4 is a fragmentary sectional view of the backlight taken along line IV—IV shown in FIG. 2;

FIGS. 5A and 5B are fragmentary sectional views of the backlight in a closed and open position, respectively, taken along line V—V shown in FIG. 2;

FIG. 5C is a fragmentary sectional view of the backlight taken along line V'—V' shown in FIG. 5A;

FIGS. 6A and 6B are fragmentary sectional views of the backlight in a closed and open position, respectively, taken along line VI—VI shown in FIG. 2;

FIGS. 7A and 7B are fragmentary sectional views of the backlight in a closed and open position, respectively, taken along line VII—VII shown in FIG. 2;

FIGS. 8A and 8B are fragmentary sectional views of the backlight in a closed and open position, respectively, taken along line VIII—VIII shown in FIG. 2;

FIG. 9A is a fragmentary elevation view enlarging the area within detail circle IX shown in FIG. 2;

Figure 3:
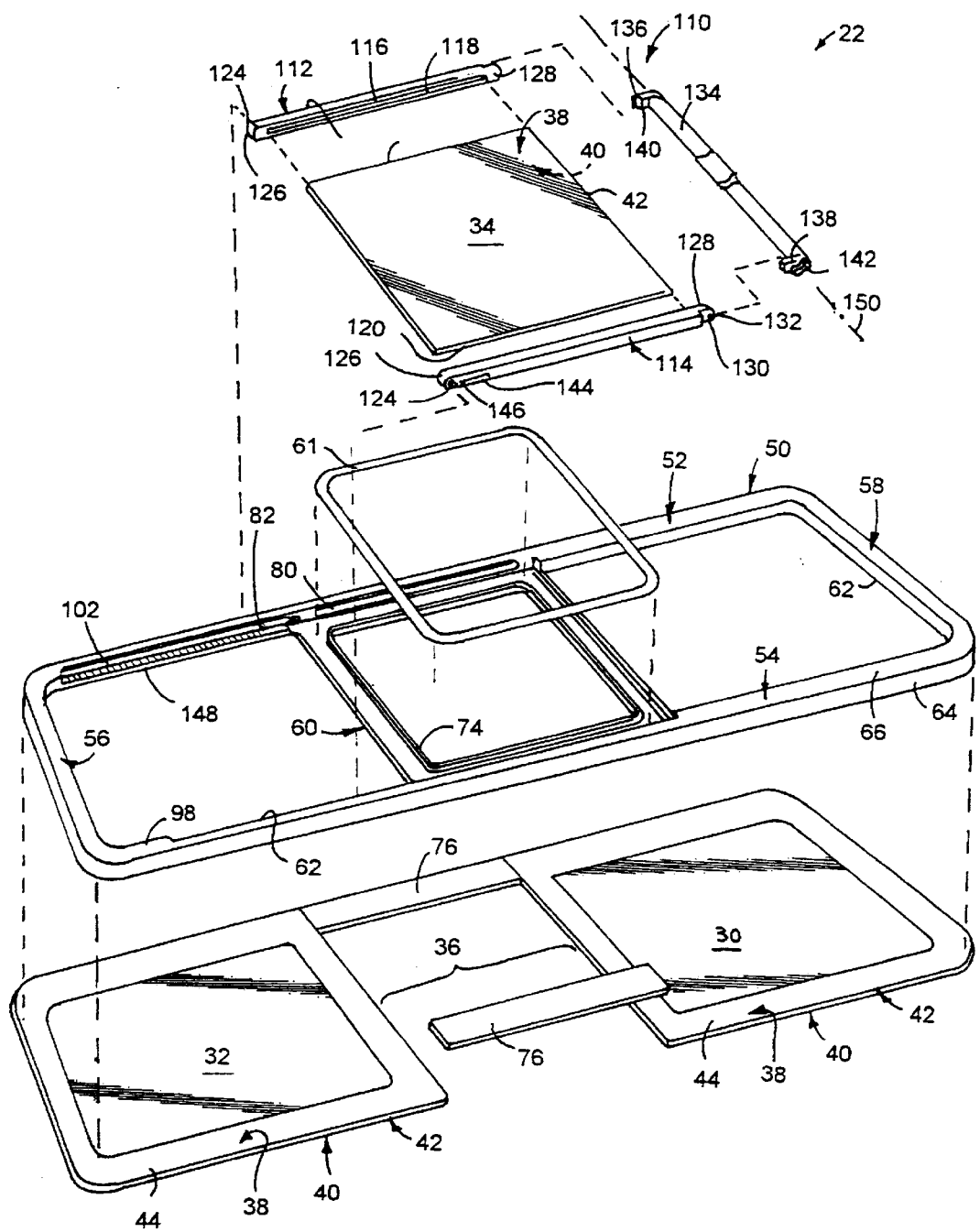
FIG. 3 is an exploded view of the backlight shown in FIG. 2.

FIGS. 9B, 9C, 9D, and 9E are fragmentary sectional views taken along lines IXa–Ixa, IXb–Ixb, IXc–Ixc, and IXd–Ixd, respectively, shown in FIG. 9A;

FIGS. 10A and 10B are fragmentary sectional views of another embodiment of the backlight taken along a line similar to line X—X shown in FIG. 2;

FIG. 11 is a fragmentary elevation view of yet another embodiment of the invention in an area similar to that shown by the circle XI shown in FIG. 2;

FIGS. 12A and 12B are fragmentary sectional views of the backlight in a closed and open position, respectively, taken along line h—h shown in FIG. 11;

FIG. 12C is a fragmentary sectional view of the backlight taken along line XIIc—XIIc shown in FIG. 12A;

FIG. 13 is an exploded view of a portion of the backlight shown in FIG. 12C;

FIGS. 14A, 14B, 14C, and 14D are fragmentary sectional views of the backlight taken along lines XIVe—XIVe, XIVf—XIVf, XIVg—XIVg, and XIVh—XIVh, respectively, shown in FIG. 11; and FIGS. 15A, 15B, and 15C are fragmentary sectional views illustrating another embodiment of the backlight of this invention.

DETAILED DESCRIPTION OF THE PREFERRED EMBODIMENTS

Referring to FIGS. 1–3, one embodiment of a rear window assembly 22 is shown fixed in a window opening 24 defined in a rear panel 26 of a utility vehicle cab 28. The rear window or backlight assembly 22 generally includes at least one, and preferably two fixed panels 30, 32 most preferably disposed at opposite ends of the window opening 24, and a third window panel 34 configured to move with respect to panels 30, 32 to open or close and seal an opening 36 between the panels 30, 32. Although the figure generally illustrates a single moving panel 34 and a pair of spaced fixed window panels, this invention may be applied to multiple moving panels configured to seal one or more openings in a window panel assembly. Additionally, the illustration of the window panel assembly as a backlight for a pickup truck, constitutes a preferred application of the invention. It is contemplated that this concept can be extended to side lights, sunroofs, and other moving panel assemblies.

In one embodiment, window panel assembly 22 includes at least one, and preferably two transparent panels or sheets 30, 32 coplanar with each other and spaced apart from each other by a predetermined distance to define the opening 36. Each panel 30, 32 includes a first surface 38 and an opposite, generally parallel surface 40, both terminating in a peripheral edge 42 generally defining the geometric shape of each window panel. Each panel is preferably made of transparent glass, which may be tempered, laminated, or otherwise strengthened using conventional techniques and principles. Additionally, each panel may be curved, bent, or generally planar to conform to the desired need or application. Although transparent glass is preferred, other sheet-like panel materials may also be used, and are contemplated to be within the definition of a glass panel. Such materials include opaque or coated glass, transparent coated or opaque plastic materials, or multi-composite laminates such as laminates of glass and plastic. It is also contemplated that window panels 30, 32 can be replaced by a single window panel having the window opening such as 36 cut or otherwise formed in the panel (not shown). This can be easily accomplished if the single window panel is formed from a polymeric material. Acceptable techniques have also been provided to cut openings in glass.

Optionally, and preferably, deposited on and bonded to surface 38 of each panel 30, 32 is an opaque and preferably black frit layer 44, and most preferably a ceramic frit layer or coating, covering and concealing a region of surface 38 from peripheral edge 42 inward. Alternatively, frit layer 44 may cover all or substantially all of surface 38. Usually, frit layer 44 conceals a continuous strip of surface 38 near peripheral edge 42, usually two inches or less in from edge 42. Since ceramic frit coating 44 includes a pigment of a desired color, preferably a dark color such as black or the like, the layer results in a permanent, second, or inside surface coloration of each panel 30, 32. When viewed from the opposite or outer side 40, the transparent thickness of each panel 30, 32, backed by the colored ceramic frit layer 44, provides an appearance of depth and richness which blends well with the surrounding painted or glass areas on the vehicle. Such frit layer also hides and conceals items mounted to the frit surface, such as the frame, seal carrier, and the like, when the assembly is viewed from the side of surface 40. One ceramic paint used to form the opaque black ceramic frit coating 44, described above, is manufactured by the CERDEC CORPORATION—DRAKENFELD PRODUCTS located in Washington, Pa.

Interconnecting and maintaining panels 30, 32 in spaced relationship to each other is a frame assembly 50 including an upper member 52 and a lower member 54. The upper and lower members 52, 54 may be solitary and separate members, but are preferably interconnected at opposite ends by vertical end members 56, 58 and by an intermediate seal carrier 60. Frame assembly 50 is preferably molded from a rigid polymeric material, preferably a thermoplastic material, and most preferably from a polyethylene tarephthalate (PET) as a single, unitary, or integral assembly using conventional injection molding techniques. The overall geometric shape of frame assembly 50 in most instances is dictated by the shape of panels 30, 32 and by window opening 22 formed in the rear panel 26 of the cab 28. The frame members 52, 54, 56, and 58 combine to form an interior wall 62 and an outer wall 64 interconnected by an intermediate web 66 to form a three-sided frame profile, such as shown in FIG. 4. The actual profile of frame 50 may vary depending upon the particular vehicle. For example, exterior side or surface 64 may have one or two steps or shoulders 68a, 68b, defined thereon. Walls 62, 64, and 66 define an interior chamber 72, bounded on three sides by each respective wall.

Frame assembly 50 is preferably bonded to the ceramic frit layer 44 of each window panel 30, 32 by an adhesive 78 applied to the free ends of walls 62 and 64, thus fixing the window panels 30, 32 in spaced relationship with respect to each other to define the opening 36 therebetween. It is preferred that the upper, lower, and end members 52, 54, 56, and 58 respectively, be bonded to the frit layer portion 44 inwardly from peripheral edge 42 by approximately 1 to 1–½ inches, and preferably such that inner wall 62 does not extend beyond frit layer 44 onto the surface 38 of either panel. It is further preferred that the seal carrier portion 60 be adhered to the portion of frit layer 44 adjacent window opening 36 such that the interior wall of 62 does not extend beyond the interior boundary or border of the frit layer 44. The preferred primers/adhesives for bonding the frame assembly to the window panels include primers 435.18, 435.20A, and 435.32; and adhesives 73002 and 73100 available from ESSEX SPECIALTY PRODUCTS of Hillsdale, Mich. Other adhesives, such as ESSEX 573.02 may also be used.

The portions of the upper and lower frame members 52, 54 spanning opening 36 may be concealed by a decorative applique or sheet of glass 76. Preferably, each piece of trim 76 is configured to span opening 36. Each applique or glass trim piece 76 preferably has a length substantially equal to the width of the window opening 36, preferably a width substantially equal to the inside edge of the frit band 44 to the peripheral edge of the glass, and preferably a thickness substantially equal to fixed glass panels 30 or 32 including the frit layer 44. Each applique or glass trim 76 is preferably attached to the surface of frame assembly 50 engaging surface 38 of each panel 30, 32, either by an adhesive, such as the one used to bond the frame to each panel, or by some temporary fastener such as a snap assembly or the like, received in the inner volume of channel 72 formed between the walls 62, 64, and 66. One example of a detachable fastener is disclosed in commonly owned U.S. Pat. No. 5,352,010 entitled POST ATTACHED STRUCTURES FOR WINDOW ASSEMBLIES issued Oct. 4, 1994, and incorporated herein by reference. Alternatively, each decorative applique or trim spanning the opening could be molded simultaneously with the formation of the upper and lower frame members 52, 54 and would not require a separate attachment step.

Disposed on seal carrier 60 is a seal 61 configured to provide a weather-tight seal about window opening 36. Seal 61 is preferably a single piece, injection molded from SANTAPRENE® brand polymeric material available from Monsanto Corp. It is also contemplated that seal 61 may be formed from other materials, including EPDM, and by other techniques including extrusion and the like. If extruded, a splice can easily be provided to form the loop around the seal carrier. Depending on the technique used to form the seal 61, it may be a bubble seal, V-shaped seal, arcing flange, or any one of a number of shapes. Seal 61 may also be formed substantially simultaneously with frame assembly 50 using molding techniques disclosed in commonly owned U.S. patent application Ser. No. 07/898,094, entitled VEHICULAR PANEL ASSEMBLY AND METHOD FOR MAKING SAME, filed Jun. 12, 1992, and incorporated herein by reference.

The upper and lower flame members 52 and 54 are similar, with a few exceptions. In one embodiment, the interior wall 62 of each upper and lower member 52, 54 includes a pair of channels 80, 82 arranged in tandem or end-to-end (FIGS. 3, 5a, and 5b). A first channel 80 is generally recessed in surface 62 in a portion of the frame assembly 50 spanning opening 36, and has a first end 84 terminating in an arcuate portion 85, arcing from the end 84 of channel 80 toward fixed window panel 30 outboard of seal carrier 60. It is preferred that arcuate terminal portion or end 85 be oriented such that its longitudinal axis is generally perpendicular to the plane containing fixed window panel 30 and window opening 36. At its furthest point from panel 30, channel 80 curves to be generally parallel to window opening 36. The opposite end 90 terminates proximate an edge of fixed window panel 32 forming one side of the opening 36.

Aligned with channel 80 and also recessed in surface 62 is a second channel 82. Channel 82 includes a first end 92 having an arcuate terminal portion 94 arcing from end 92 generally toward fixed panel 32, but having a greater radius than that exhibited by arcuate portion 85 in channel 80 such that an axis including the arcuate end 94 is oriented at an obtuse angle with respect to the plane containing fixed window panel 32 and window opening 36. From the end of arcuate portion 94 furthest from window opening 36, channel 82 extends generally parallel to window panel 32 toward its opposite end. The opposite end 96 is located generally intermediate vertical member 56 and end 90 of channel 80.

In one embodiment, water dripping down the exterior surface 40 of the window panel 34, or otherwise entering the opening 36, may be collected by water channels or gutters 81 defined along the bottoms of channels 80 and 82 in lower frame member 54. Gutters 81 may be inclined from one end of each channel toward the opposite end so as to cause the water to drain through openings 83. Since it is contemplated that the frame assembly 50 will be mounted to the exterior of the vehicle pinch weld flange (not shown), which defines opening 24 in the vehicle panel 26, water will be diverted to the exterior of the vehicle.

Exhibiting a positive relief with respect to surface 62 of frame assembly 50, and extending from vertical member 56, and between channels 80 and 82 and fixed panels 32, is a raised surface 98 defining a wall 100 (FIG. 5A). A vertical channel 104 is defined in wall 100 at the end 96 of channel 82, and is configured to receive an elastomeric bumper 106 to absorb impacts with moving window panel 34. Wall 100 also includes a plurality of vertically oriented crenulations, ridges, or valleys 148. The peaks and valleys may be sharp (V-shaped transitions) or gentle (radiused transitions). The frequency or number of ridges per unit length of wall 100 may also vary for reasons which will become more apparent below.

Referring to FIGS. 2, 3, and 5B, window opening 36 defined between the fixed panels 30, 32 is closed by the movable window panel 34 mentioned above. Window panel 34 is substantially similar to fixed panels 30, 32 with the exception of shape. It may be made from the same type of materials as panels 30, 32 and may also include a peripheral ribbon or strip of frit coating described above. In a preferred embodiment, window panel 34 is generally rectangular in shape and has its upper and lower ends receiving and retaining end cap members 112, 114, respectively, each preferably receiving an end 120 of panel 34 in a channel 116 defined in surface 118. The end caps are preferably retained on the window panel 34 by an adhesive, such as described above. An outer facing surface 122 opposite inner surface 118 in each end cap 112, 114 includes a detent or projecting pin 124 extending therefrom at a first end 126 while the second, opposite end 128 has a cutaway 130 defined thereon. Extending from the floor of the cutaway is a second detent or pin 132, configured to receive one end of a latch handle 134. Upper and lower flanges 136, 138, respectively, extending from the ends of the latch handle, each have a recess 140 adapted and configured to receive the detents 132 to enable handle 134 to pivot and rotate about an axis 150 defined between detents 132. Flanges 136 and 138 also include raised, curved projections, or cams 142 extending outwardly from a side opposite that containing recess 140, only one of which is shown in FIG. 3. Cams 142 and detents 124, respectively, are slidably disposed in channels 80 and 82 in the upper and lower members 52, 54.

In a preferred embodiment, it is contemplated that the sliding window panel 34 is placed in frame assembly 51 by tipping or rotating window panel 34 in a manner such that detent 124 extending from the first end 126 of each end cap is received in its respective channel. Snap-fit over the second detent 132 of each end cap members 112, 114 is the latch handle 134, which is already positioned in the respective channels by cams 142 when detents 132 are snap-fitted into recesses 140.

Alternatively, channels 80 and 82, formed in the upper frame member 52, can be deeper than those formed in the lower frame member 54 to permit the replacement of window 34 in the frame assembly 50. Because it is contemplated that frame assembly 50 will be made from a rigid, molded material, room can be provided in one frame member to insert one end cap far enough to provide clearance for the other end cap to move onto surface 62 and into channels 80, 82. The upper frame member is a natural selection for the deeper channels. Appropriate pressure may be maintained on the ends 120 of the window panel 34 by compressive leaf springs in channels 80 and 82. Alternatively, or in combination, upper member 52 may be configured such that window 34 can only be inserted at ends 90 and 96 of the channels 80 and 82.

Referring to FIGS. 3, 5A, and 5B, each end cap member 112 and 114 preferably includes a mechanism for maintaining the relative position of panel 34 with respect to window opening 36. One way to achieve this is provided by a leaf spring 144 extending from a surface of at least one end cap member 112, 114 which is adjacent wall 100 when in the open position. Leaf spring 144 may be integral with and cantilevered from each end cap member 112, 114, in a direction generally parallel to glass panel 34. An enlarged tip or projection 146 may be provided at a free end, and configured to engage ridges and valleys 148 vertically defined along wall 100. The shape of projection 146 will depend upon the sharpness of the crests and valleys. For example, if the crests and valleys are chevron in character, tip 146 may also be V-shaped to be received between adjacent crests on wall 100. Alternatively, projection 146 may be a blade of metal of sufficient character to hold the window in place, but also flex and slide over each crest or peak. In yet another form where the crests and valleys are radiused, tip 146 may also have the same radius to be received by a valley. The degree of friction to be exerted can be controlled by the rigidity of the shaft of spring 144 as well as by the amplitude of the crenulations, the frequency, and the slope, steepness, or angularity of the walls or surface interconnecting the crests and valleys, and the surface area of tip 146 engaging or resting in a valley. This arrangement is provided to control the sliding force required to move the window panel 34 between the open and closed positions.

Referring to FIGS. 6A–8B, the relative positions of the moving window panel 34 between a sealed and closed position (FIGS. 6A, 7A, and 8A) and an open and unsealed position (FIGS. 6B, 7B, and 8B) are shown. With the window in the closed position, window panel 34 is urged generally perpendicular against seal 61. The end cap members 112 and 114 are also moved toward the seal carrier 60 and the applique or glass trim 76. In this configuration, seal 61 is compressed against seal carrier 60 by the exterior surface 40 of panel 34. The relative direction of movement or translation of the window panel 34 with respect to seal 61 and seal carrier 60 between the sealed and unsealed positions is indicated by the arrow N. As seen in FIG. 6B, window panel 34 is moved perpendicularly away from seal 61 so that the outer surface 40 disengages seal 61. Similarly (FIGS. 7A and 7B) with the latch handle 134 moved and rotated about axis 150 (FIGS. 8A, 8B) in a direction to the closed position, cam 142 disposed within channel 80 forces the end cap members 112, 114 generally in a direction perpendicular to applique or trim piece 76 as shown by arrow N. When the latch handle 134 is moved and rotated in a direction B about axis 150 to the open position, the force exerted by the eccentric cam 142 is released moving cam 142 to a position generally parallel to channel 80 and allowing cam 142 to travel within channel 80 generally perpendicular away from the applique or trim panel 76, as shown by the arrow N. While in the open position, the operator may then slide window 34 in a direction indicated by arrow C (FIG. 8B) generally parallel to panels 30, 32, so as to slide the panel away from opening 36.

Referring now to FIGS. 9A–9E, details of one end of the latch handle 134, flange 138, and cam 142 are shown with the window 34 in a sealed and closed position. Cam 142 generally has a longitudinal axis indicated by line E (FIG. 9B) defining a first end 152 and an opposite locking end 154. End 154 includes a gently curved indentation 156 configured to receive a ridge 158 defined in end 86 of channel 80. Between ridge 158 and the arcuate portion 84, channel 80 includes a recess 160, which conforms generally to the arcuate end 154 of the cam 142. The arcuate recess 160 is provided to receive end 154 when cam 142 is rotated as a result of the change of direction caused by end 152 careening along arcuate portion 84 toward terminal end 85. The latch is moved into the locking position and held by rotating cam 142 in a counter-clockwise motion (with respect to FIG. 9B) such that indentation 156 is received over ridge 158. In FIG. 9C, detent 132 is shown received in the partial hole or recess 140 formed in the interior surface of flange 138 at the end of handle 134. Note that a surface 162 of flange 138 and handle 134 is in contact with fixed window panel 30 when the moving window panel 34 is in the closed and locked position. FIG. 9D shows in greater detail the interaction or bearing structure provided by the end 128 of lower end cap member 114, which engages in a ball/socket arrangement in the interior surface 164 of handle 134. A portion 166 of handle 134 forming the socket 164 partially surrounds the cylindrical surface of projecting end 167 (second end 128) of end cap 114. When handle 134 is rotated about the cylindrical surface of projecting end 167 in a clockwise direction (FIG. 9D), surface 170 engages stop 172 formed on the opposite side of end 167 to limit the rotational travel of handle 134 when moved to the open position.

The window panel assembly 22 described above may also include a polymeric gasket attached to fixed window panels 30, 32 outboard of frame assembly 50 to assist in fixing the window panel assembly 22 within the window opening 24 and provide a seal of the window assembly in the window opening 24. The gasket or seal may be made from a thermoplastic material, such as reaction injection molded (RIM) urethane, polyvinyl chloride, EPDM, or rigid plastic material and may be in any one of a number of configurations. It is contemplated that the seal may be either a single-sided, flush-mounted gasket or a three-sided encapsulation such as disclosed in commonly owned U.S. Pat. No. 5,352,010 entitled POST ATTACHED STRUCTURES FOR WINDOW ASSEMBLIES. It is also contemplated by this invention that the polymeric gasket or seal may be formed or molded to enclose or partially encapsulate the exterior wall or side 64, a portion of intermediate web 66, as well as a portion of surface 38 containing the frit layer 44. Although molding the gasket or sealing material directly to the window panel is suggested, additional seals or gasketing techniques may be employed, such as preforming the gasket and adhering the gasket to the window panel assembly as disclosed in commonly owned U.S. patent application Ser. No. 08/898,094, filed Jun. 12, 1992, entitled VEHICULAR PANEL ASSEMBLY AND METHOD FOR MAKING SAME. Moreover, special adhesives and primer materials may also be employed to obtain a superior bond of the gasket to the window panel assembly, such as disclosed in commonly owned U.S. patent application Ser. No. 08/027,078, filed Mar. 5, 1993, entitled VEHICLE PANEL ASSEMBLY, METHOD AND APPARATUS FOR MAKING SAME, now U.S. Pat. No. 5,544,458. The disclosures of all of the aforementioned commonly owned patents and/or patent applications are hereby incorporated by reference.

In operation of the window assembly 22 described above, the sliding or moving window panel 34 is disposed between the upper and lower members 52, 54 of the frame assembly 50 by any one of the techniques described above. Once the moving window panel assembly 110 is in place, it is configured to slide within the respective channels parallel to the fixed window panels 30, 32 and with respect to the window opening 36. In the closed position, such as shown in FIG. 5A, the detents 124 and cams 142 have been slidably moved to the first ends 84 and 94 of the respective channels 80, 82. The handle assembly 134 is rotated about axis 150 in a direction indicated by arrow A (FIG. 8A), which causes cam 142 (FIG. 9B) to move end 152 into the terminus 85 of the arcuate portion 84 and causing the opposite end 154 to be urged against the recess 160. Rotation of handle assembly 134 also forces detents 124 into the ends 94 of channels 82. The effect of 154 urged against surface 160 causes the window panel 34 to be moved against seal 61, such as shown in FIGS. 5A, 6A, 7A, and 8A. The moving window panel 34 is unsealed and moved substantially perpendicularly away from seal 61 and window opening 36 by a rotation of handle 134 about axis 150 in a direction generally indicated by arrow B (FIG. 8B). The rotational movement of handle 134 causes end 154 of cam 142 to disengage ridge 158 and move into the channel 80. Simultaneously, end 152 of cam 142 is moved away from the terminal end 85 of arcuate portion 84 by the force exerted against moving window panel assembly 110 by seal 61 and by the lever action of cam 142 rotating about the bend in the channel between the arcuate end 84 and the portion parallel to window 36. In this configuration, edge 42 of window panel 34 is allowed to move away from seal 61. Upon the application of a force in a direction generally indicated from right to left, as shown in FIG. 2, the detents 124 and cams 142 extending from each end cap ride within the respective channels 80, 82. The relative position of the moving window panel assembly 110 may be temporarily retained between the respective ends of the channels with the aid of the tip 146 on spring 144 engaging the ridges and valleys 148 defined in the wall 102 of the upper and lower members 52, 54. The bumpers 106 disposed at the ends 96 of channels 82 absorb any impact with the end caps 112, 114 when the moving window panel assembly 110 is moved to the terminal ends of the channels. A reversal of parts may achieve the same function.

An alternate embodiment of the invention 200 shown in FIGS. 10A and 10B includes a moving window panel 202 having opposite ends 204 retained by end caps 206 configured to be received in channels 208, 210 formed in the inner wall or side 212 of each upper and lower frame member 214 in the same manner as described above. The relative position of the moving window panel 202 may be maintained with respect to the window opening 216 and/or fixed window panel 218 by a resistance or friction-positioning assembly generally indicated as 220. The friction-positioning assembly 220 includes a spring 222 made from a spring metal or similar type of material performing a similar function and having a base 224 anchored to a plateau surface 226 by fasteners 228, such as rivets, screws, or similar fasteners. The spring 222 includes a tip 230, which is configured to engage crenulations or ridges and valleys 232 defined on a surface 234 of each end cap immediately adjacent or facing the fixed window panel 218 when in the open position as shown in FIG. 10B. With the tip 230 located between adjacent ridges, the friction exerted across the tip 230 by the ridges 232 is sufficient to prevent the moving window panel assembly 202 from sliding in the channels 208, 210, without force applied by the operator.

In yet another embodiment of the invention 300, shown in FIGS. 11–14D, the moving or sliding window panel assembly 302 includes the moving window panel 304 having opposite ends 306 received in and fixed to the end cap members, such as shown as 308. End members 308 are different with respect to the end members described above only to the extent that the end 310 opposite end 312 includes tabs or fingers 322 forming a C-shaped opening. The C-shaped opening provides a cylindrical bearing surface 314 configured to receive a cylindrical shaft 316 extending from the ends of handle 318 (FIG. 13). Shaft 316 is retained within the bearing surface 314 by cap member 320 configured to be received over and engage in locking configuration with fingers 322 extending from end 310. The spaced, interior edges 321, 323 of the top and bottom walls of cap member 320 also form a portion of the bearing surface 314. Extending from the bottom surface of each end cap member proximate end 312 is a cylindrical pin, cam follower, or detent 340 having a length and diameter configured to be received in the channels formed in the upper and lower frame members as described above.

Extending from shaft 316 and located below the end cap member 308 is a cam 324. Cam 324 is spaced intermediate cap member 320 and the end 325 of the shaft 316. Cam 324 has a width substantially equal to the diameter of the shaft 316 to enable the shaft and the cam to slide within the channel 326. The length of cam 324 is substantially equal to the distance between the terminal end 328 of arcuate portion 330 and recess 332 of channel 326 to allow one end 334 of the cam to force end 325 of shaft 316 toward the terminal end 328 of channel 326 (FIGS. 14A and 14B) when the shaft. is rotated via handle 318.

The end cap members, such as shown as 308, retaining opposite ends 306 of the window panel 304, the handle 318, and cap 320 may be formed from a variety of materials although it is preferred that they are made from a resinous, polymeric material. Because of the potentially prolonged exposure to the elements, it is preferred that a material capable of withstanding extreme temperature variations and UV radiation be used. For example, glass reinforced nylon or other rigid thermoplastic material is preferred. Techniques used to form the various components include injection molding and machining. End cap members, such as 308 and ends 325 of shaft 316, may be made from a low friction material to reduce friction in sliding the window panel assembly 302 along the channels.

In operation, the alternate embodiment 300 works substantially similar to the embodiment described above. The moving window panel assembly 302 is slidably received in the channels described above in the upper and lower members such that the cam followers 340 and 325 are received in their respective channels 326, only a portion of which is shown. The width of the cam 324 is substantially identical to the width of shaft 316 which, in turn, is just slightly less in width than the width of the channel 326 to permit cam 324 and shaft 316 to glide freely within the channel, so long as the cam 324 has its longitudinal axis aligned with the longitudinal axis of channel 326. A similar arrangement or mirror image of the configuration shown in FIG. 13 occurs at the upper end of the moving window panel assembly 302 in the upper frame member. With the moving window panel assembly 302 moved toward end 328 of channel 326, end 325 of shaft 316 travels within the arcuate portion 330 to cause window panel 304 to move in a direction generally perpendicular to seal 342. A similar arrangement exists in the tandem channel followed by detent 340. Window panel 302 is urged tightly against to engage seal 342 by a rotation of handle 318, causing cam 324 to move against and over ridge 344 and snap into recess 332 in arcuate end 330. Ridge or projection 344 frictionally retains cam 324 in recess 332, thus holding sliding window panel assembly 302 in sealed engagement with seal 342 (FIG. 14B). To open window panel assembly 302, handle 318 is rotated clockwise with respect to the view of FIG. 14D, causing cam 324 to ride from recess 332 over ridge 344 and into channel 326, thus levering window panel 304 substantially perpendicularly away from seal 342. At the extent of its perpendicular travel away from window opening 348, window panel assembly 302 can slide in the tandem channels in a direction substantially parallel to fixed window 350 and opening 348.

Another embodiment of the invention 400, shown in FIGS. 15A, 15B, and 15C, works generally on the same principle as described above. Because the upper portion of the window panel assembly is substantially similar or a mirror image of the lower portion, the following description will make reference only to the lower half shown in fragmentary section view. Each upper and lower frame member 402 of frame assembly 404 has one edge or surface 406 attached to stationary window panels 408, 410 to fix them in spaced relation and defining window opening 412. Appliques or glass trim panels 414 including opaque frit layers on their inner surfaces may span opening 412 and conceal a portion of the frame members spanning opening 412. Immediately adjacent opening 412 and bonded to an interior surface 416 of panels 408 and 410 is a seal carrier 418 integral with and interconnecting the upper and lower frame members of the frame assembly 404. Seal carrier 418 is configured to retain a bulb seal or generally Y-shaped seal 420 which may encircle opening 412. Seal 420 may include a pair of projections 422, 424 interconnected to form a concave or U-shaped sealing surface 426.

Defined in interior wall 428 of frame assembly 404 are nested channels including a first relatively shallow channel 430 having a first generally rectangular end 432 terminating adjacent fixed window panel 408 near window opening 412 and a substantially semicircular second end 434 terminating adjacent the second fixed panel 410 intermediate window opening 412 and the left hand vertical member or end of the window assembly (not shown). Channel 430 includes a vertical wall portion 436 and a floor 438. Channel 430 is preferably deeper in the upper member (not shown) than in lower member 402 to allow insertion of the movable window panel assembly. Additionally, it is preferred that frame assembly 404 be molded from a rigid polymeric material such as polyethylene teraphthalate or like material.

Defined within floor 438 of channel 430 is a second channel 440 having a first end 442 terminating generally adjacent fixed panel 408, and having a portion 444 extending in a direction generally at a right angle to surface 416 of panel 408. At a predetermined distance from panel 408, channel portion 444 sweeps generally in a right angle to extend for a predetermined distance generally angular to channel 430. Gradually, channel 440 arcs toward window opening 412, terminating at a second end 446 (FIG. 15C) generally adjacent fixed panel 410 at the left hand margin of window opening 412. Channel 440 also includes a third channel 448 therein defined in floor 450. Channel 448 is intended to serve the function of draining water flowing into channels 430 and 440. A drain hole (not shown) may be provided in channel 448 to the exterior of the vehicle.

Received in channels 430 and 440 of the upper and lower frame members, and slidably disposed therebetween is a moving window panel assembly 452, which includes a pane of glass or other transparent panel 454 having its upper and lower ends received in an end cap such as 456. In plan view as shown in FIGS. 15A–15C, each end cap 456 is generally wedge shaped or tapered, having a generally narrow rounded first end 458 and a wider rounded second end 460. A channel or slot 462 is defined in the end cap oriented substantially parallel to edge or side 464 between ends 458 and 460, configured to receive and retain one end of the window panel 454. End cap 456 is configured such that end 460 rides within channel 430 while end 458 follows channel 440. A cylindrical pin, detent, or cam follower (not shown) extends from the bottom of end cap 456 proximate end 458 and is of a diameter slightly less than the width of channel 440. The detent or cam may be provided by one of the handle embodiments described above and shown in FIGS. 3 and 13. In the embodiment shown in FIGS. 15A–15C, substantially all of the components retaining fixed windows 408, 410 and sliding window 454 are preferably made from thermoplastic polymeric material, using extrusion or injection molding techniques.

In operation, the sliding window 454 and the attached end cap members or cam followers 456 are disposed in sliding relationship between the upper and lower frame members such as 402. As briefly mentioned above, the depth of the channels 430 and 440 in the upper frame member are preferably greater at least at one point along their length to permit the upper end cap member to be received therein and provide sufficient clearance for the lower end cap member 456 to clear surface 458 and be received in the channels 430, 440 in the lower frame member 402. In the closed position, end cap members have end 458 located at the terminal ends of channels 430 and 440, the cam or detent within channel 440 forcing end 458 in a direction substantially perpendicular to the plane of fixed window panel 408, and window opening 412. In the closed and sealed position, the outer surface 466 of glass 454 is forced against seal 420 overlapping peripheral edge portions of fixed panels 408 and 410. Window 454 is opened by rotating and releasing the handle (not shown) allowing the detent or cam disposed in channel 440 to arc outwardly away from the terminal end 442, swinging window panel 454 in a similar direction about a pivot point 468 in end 434 located approximately at a point equal to one-half the width of channel 430. Arcing of the window panel 454 about point 468 disengages the window panel 454 with the seal 420. With the end 458 moved to its fullest extent in a direction normal to panel 408, channel 440 swings generally parallel to panel 408 for a predetermined distance, window 454 is permitted to slide substantially parallel to panels 408, 410 in order to move panel 454 from over opening 412. At a predetermined point determined so as to prevent unnecessary friction with the left hand portion of seal 420 (as seen in FIG. 15B), channel 440 cams gently toward window opening 412, bringing the right hand exterior surface of panel 454 against seal 420. This second sealing position is provided to prevent air from leaking through the gap between fixed window panel 410 and moving window panel 454 (FIG. 15C).

The different component,; described above in the various embodiments may be combined to achieve embodiments not specifically described herein. For example, the handle 318 shown in FIG. 13 could be used with the end member 456 shown in FIG. 15. Likewise, the resistance mechanism 220 shown in FIGS. 10A and 10B may be reconfigured such that the ridges and valleys are formed in either the floor or wall of the channels in the frame assembly. In yet another alternative, instead of the friction mechanism described above, flocking may line the walls of the channels to allow the moving panel to slide once a predetermined force is used, but will not move under normal operation of the vehicle. The flocking may also reduce air drafting around the moving window panel and up through the channels.

This invention offers a number of advantages over prior assemblies including a sliding vehicle window assembly which has few components compared to conventional sliding window assemblies, is low in cost, and requires little assembly. Additionally, the window panel is substantially flush with the exterior of the vehicle. There are no components which extend beyond the exterior surface of the fixed panels. Additionally, all of the components may be injection molded from lightweight, rigid materials, resulting in less expense. Moreover, the window assembly design is easy to assemble resulting in less man hours per unit and, as a result, less cost. Yet another advantage provided by this invention is the versatility and compatibility to receive a wide range of molded or extruded gaskets or sealing members to accommodate a wide range of vehicle opening. One-, two-, and three-sided gasket encapsulations may be attached to the vehicle window assembly. This versatility also results in a number of adhesive applications to bond the window assembly in the vehicle opening.

It is contemplated that the frame assembly may include only the upper and lower frame members spaced apart from each other and bonded to the surface of the panels. The end vertical members have been omitted and only the seal carrier interconnects the two members. A molded or extruded gasket may be deposited on the window panel assembly outboard of the two frame members to form a seal with the vehicle.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

What is claimed is:

1. A sliding vehicle window assembly, comprising in combination:

a pair of window panels, each having first and second generally opposing parallel surfaces terminating in a peripheral edge, spaced from each other by a predetermined distance to define an opening;

a molded polymeric frame spanning said opening and attached to said first surface of said pair of window panels proximate said peripheral edge to interconnect and fix said pair of window panels in spaced relationship, said molded polymeric frame including upper and lower frame members, each having an inwardly facing edge containing a pair of channels arranged in tandem generally parallel to said frame members, said molded polymeric frame also including an integrally molded seal carrier interconnecting said upper and lower members and attached to said first surface of said pair of window panels proximate said opening;

a seal attached to said seal carrier and surrounding said opening;

a moving window panel having opposite ends;

a pair of endcaps having a top and a bottom edge, said endcaps being attached to each of said opposite ends respectively of said moving window panel, each end cap having portions slidingly disposed in one of said channels in said upper and lower members;

said channels having a first portion configured to move said moving window panel assembly generally perpendicular with respect to said seal carrier in and out of sealing engagement with said seal, and a second portion to move said moving window panel assembly generally parallel to said seal carrier away from said opening; and a latch operatively connected to each of said end caps for providing movement of said moving window panel into and out of sealing engagement with said seal.

2. The sliding vehicle window assembly as defined in claim 1, further including:

an opaque layer deposited over a predetermined area on said first surface of each of said pair of window panels proximate said peripheral edge;

a primer layer deposited on at least one of said opaque layer and a portion of said molded polymeric frame adjacent said first surface of said pair of window panels; and an adhesive bonding said molded polymeric frame to said first surface of said pair of window panels.

3. The sliding vehicle window assembly as defined in claim 1, wherein said movable window panel is held selectively at one of a plurality of positions along said channels by a resistive detent assembly.

4. The sliding vehicle window assembly as defined in claim 1, further including first and second sheet-like panels coplanar with said pair of window panels and spanning said opening, and each attached to one of said upper and lower members.

5. The sliding vehicle window assembly as defined in claim 1, wherein said molded polymeric frame includes a pair of integrally formed vertical members located at opposite ends of said upper and lower members for interconnecting said upper and lower members together as a one-piece frame.

6. The sliding vehicle window assembly as defined in claim 1, wherein said molded polymeric frame is configured to be received in and seal a window opening in a utility vehicle.

7. The sliding vehicle window assembly as defined in claim 1, wherein each end cap includes:

one edge of said end cap attached to one edge of said moving window panel; and at least one follower defined on said end cap and configured to follow at least one of said channels in said upper and lower members.

8. The sliding vehicle window assembly as defined in claim 1, further including at least one trough or channel defined in said lower member to channel moisture away from said window opening.

9. The sliding vehicle window assembly as defined in claim 8, wherein said trough is defined in a floor of at least one of said pair of channels.

10. The sliding vehicle window assembly as defined in claim 1, wherein said seal is attached directly to said pair of window panels adjacent said opening.

* * * * *

UNITED STATES PATENT AND TRADEMARK OFFICE
CERTIFICATE OF CORRECTION

PATENT NO.    : 5,996,284
DATED         : December 7, 1999
INVENTORS     : Corey A. Freimark et al.

It is certified that error appears in the above-identified patent and that said Letters Patent is hereby corrected as shown below:

Column 1, line 7;
    After "5,799,444" insert --issued September 1, 1998,--.

Column 15, line 3;
    "component,;" should be --components--.

Column 16, claim 1, line 10;
    "endcaps" should be --end caps each--.

Column 16, claim 1, line 11;
    "endcaps" should be --end caps--.

Signed and Sealed this

Thirteenth Day of March, 2001

*Attest:*

NICHOLAS P. GODICI

*Attesting Officer*       *Acting Director of the United States Patent and Trademark Office*